H. STANTON.
Churn.
No. 6,961.
Patented Dec. 18, 1849.
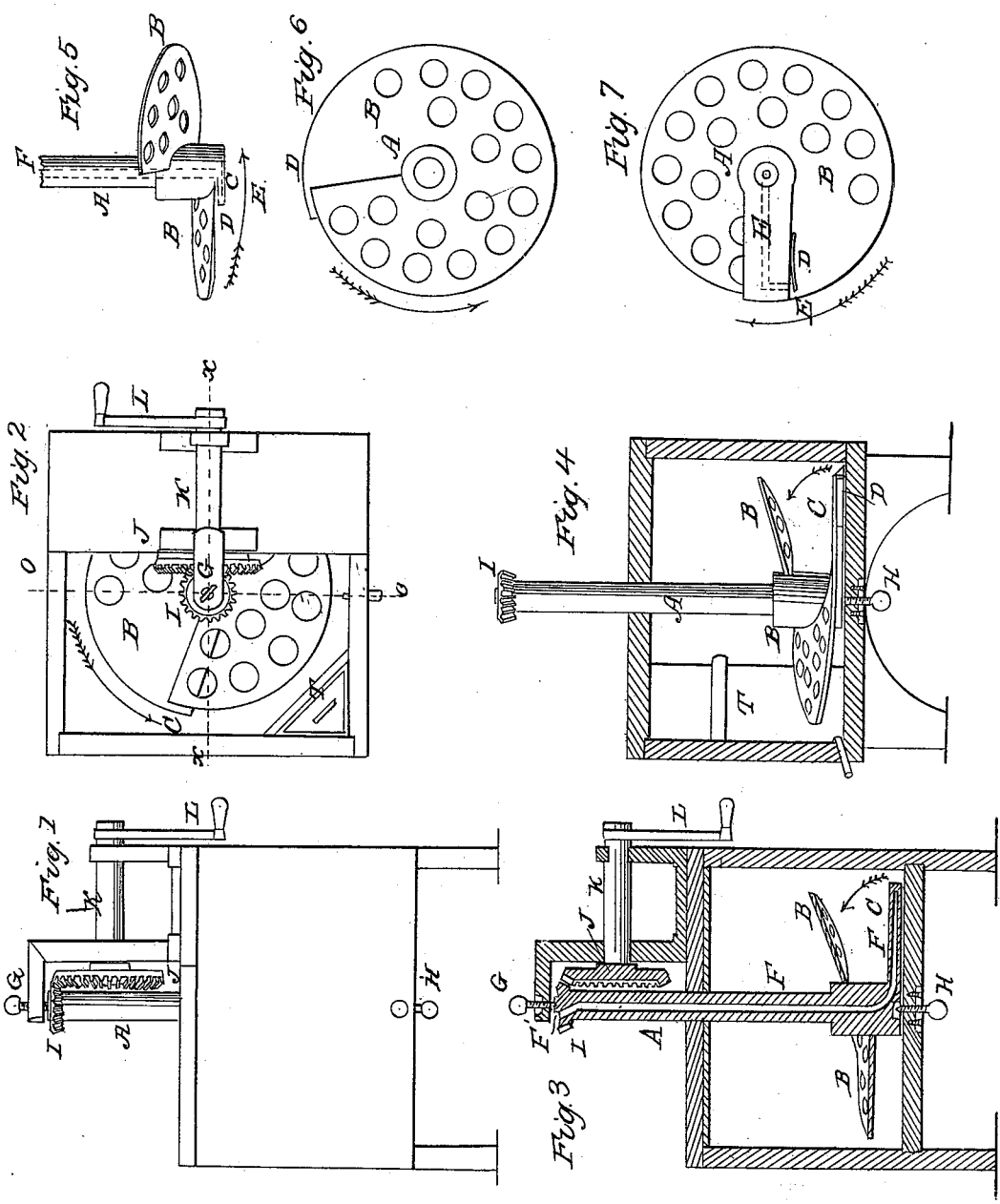

UNITED STATES PATENT OFFICE.

HENRY STANTON, OF RICHFIELD, NEW YORK.

CHURN-DASHER.

Specification of Letters Patent No. 6,961, dated December 18, 1849.

*To all whom it may concern:*

Be it known that I, HENRY STANTON, of Richfield, in the county of Otsego and State of New York, have invented a new and useful Improvement in Churns, called "Stanton's Atmospheric Churn," which is described as follows, reference being had to the annexed drawings of the same, making part of this specification.

Figure 1 is an elevation of the churn. Fig. 2, is a top view of ditto, a portion of the lid being removed. Fig. 3, is a vertical section on the line $x$, $x$, of Fig. 2. Fig. 4 is an elevation one side of the box and parts of the gearing being removed. Fig. 5 is an elevation of a part of the hollow shaft and spiral float. Fig. 6 is a plan or top view of ditto. Fig. 7 is a view of ditto inverted.

The arrows show the direction of turning the spiral float while churning. In gathering the butter its motion is reversed.

The same letters indicate like parts in all the figures.

The nature of my invention and improvement consists in a peculiar construction of a spiral float for churning and gathering the butter, combined with an air tube or arm placed in such position as to form a vacuum when turned with a slow motion said arm being made in the form of a wedge and provided with a valve to prevent the butter getting in the tube while gathering the butter. Likewise to prevent the cream getting into the said hollow arm while the churn is not in action. Also in constructing the top of the hollow shaft of the spiral float funnel shaped for pouring in an alkali for disseminating it more evenly through the cream. Likewise in combining with the churn a heater and a cooler, which is made movable so as to be taken out and put in at pleasure for keeping the cream at the required temperature using heated or congealed water in the heater and cooler for raising and lowering the temperature of the cream to be churned.

The churn tub or vessel into which the cream is poured, and in which the churning, gathering, heating and cooling apparatus is placed, is made in the usual manner.

The churning and butter gathering apparatus consists of a hollow revolving vertical shaft A—spiral perforated float B—hollow radial wedge shaped arm or air tube C— with a spring valve D. The cream temperer is marked T.

The perforated spiral float B for making the vacuum and for raising the cream and letting it fall through the air in the churn tub and for gathering the butter when the motion of the float is reversed is made of wood in one piece and cramped or pressed in the form of a screw. It passes spirally around the central hollow shaft and turns with its lower end near the bottom of the tub and its upper end above the surface of the cream. This spiral float with vertical axis answers a three fold purpose—namely for producing a vacuum—agitating the cream—and gathering the butter—the butter being churned by turning the spiral float to the right and gathered by turning it to the left—that is to say the particles of butter are separated from the butter-milk and gathered together into a solid mass by the action of the lower portion of the spiral float and the thick edge and under surface of the wedge shaped arm attached thereto when the motion of the shaft is reversed—the milk being prevented from entering the arm C by the closing of the spring valve D over the outlet of the channel or way in the arm C. This spring is represented as open in Figs. 4, 5 and 7 of the annexed drawing.

The hollow radial prismatic arm C is made of a triangular shape in its cross section, as shawn in Fig. 5, and let into the shaft by one of its ends and fitted against the lower end of the spiral float having a bore E extending from its thick edge to the middle of the arm as seen in Fig. 7), then turned at right angles and extended horizontally and radially until it intersects the vertical aperture F in the center of the central shaft A. The mouth of the bore F is made funnel shaped, as seen at F', for pouring in alkali and for letting in the air more freely.

The hollow shaft is held in its position by means of two pointed set screws G, H, one placed at the foot of the shaft and the other at its head by which the float can be removed from the churn at pleasure for discharging the butter and cleansing the box on the inside, by merely withdrawing the screws.

A small bevel wheel I, is fixed to the top of the hollow shaft matching with a larger level wheel J on the end of a horizontal shaft K turned by a crank L in the usual manner. The bearings of this shaft K and the seat for the nut of the set screw G are attached to one half of the lid of the churn.

The spiral float B is imperforated from the wedge shaped arm to about one quarter of a circle for the purpose of lifting the cream and forming a vacuum beneath the same which is instantly filled by the air rushing down through the central shaft and out through the radial arm. By thus uniting the imperforated portion of the spiral float to the thick edge of the wedge shaped arm in which is made the outlet of the air channel a vacuum may be formed when the float turns slowly, which cannot be effected by the simple radial arm without the spiral lifting float above the same. This portion of the float and the thick edge of the radial arm and its inclined bottom also serve an admirable purpose in gathering the butter when the motion of the float is reversed.

The remainder of the spiral float is perforated with holes through which the cream descends after being lifted above the level at which the cream stands in the box by the rotary action of the float, causing the fatty or oily particles of the cream to be brought more immediately into contact with the oxygen of the atmosphere in the upper portion of the box, which, together with the contact of streams of pure air drawn in through the hollow shaft and arm and diffused throughout the cream below its surface and the mechanical agitation of the cream produced by the float and streams of air will cause the production of the butter in a few moments and which is gathered into a mass in the manner above stated.

In order to raise or lower the temperature of the cream to bring it to a proper state for churning, I make use in combination with this churn tub, of a metallic vessel partly filled with ice or warm water—said vessel being partly immersed in the cream. This vessel T is of a triangular, or other shape, and is placed in a corner of the box or tub, or in any convenient position to effect the desired object, being provided with a handle by which it can be withdrawn from the churn or placed into it at pleasure or raised and lowered in the cream.

The alkali for correcting the acidity of the cream (when it is found to be in an acid state) is poured into the basin at the head of the hollow shaft when the float is in motion which soon suffuses it throughout the cream.

As the operation of this churn has been described in giving a description of the several parts there will be no need of repeating it.

I do not claim the tub, hollow shaft, hollow arm, or any part of the churn that has heretofore been used for making butter, but What I do claim as my invention and desire to secure by Letters Patent is—

The combination of the perforated spiral float B, with the prismatic horizontal radial arm C and vertical shaft A arranged and operating in the manner and for the purpose herein set forth.

In testimony whereof I have hereunto signed my name before two subscribing witnesses.

HENRY STANTON.

Witnesses:
　JAMES EATON, Jr.,
　FORD TANNER.